(No Model.) 2 Sheets—Sheet 2.
F. D. OWEN.
WHEEL TIRE.
No. 507,089. Patented Oct. 17, 1893.
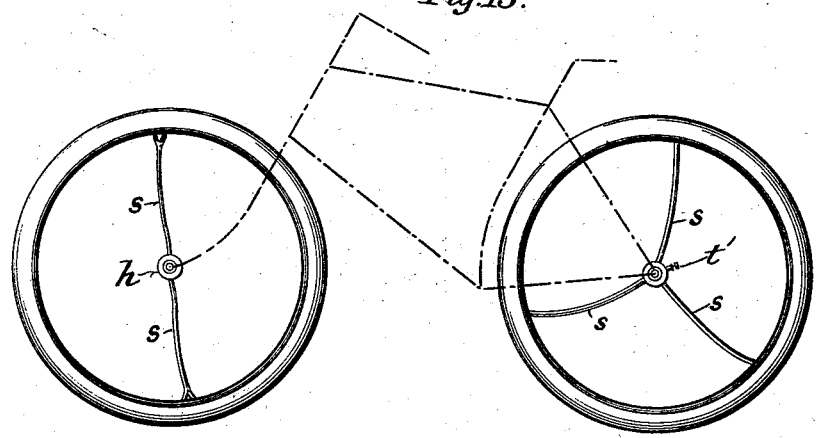
Fig. 13.
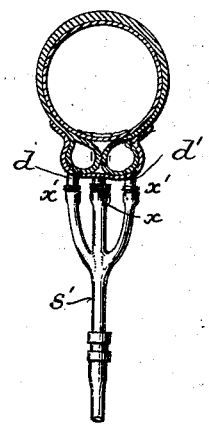
Fig. 16.
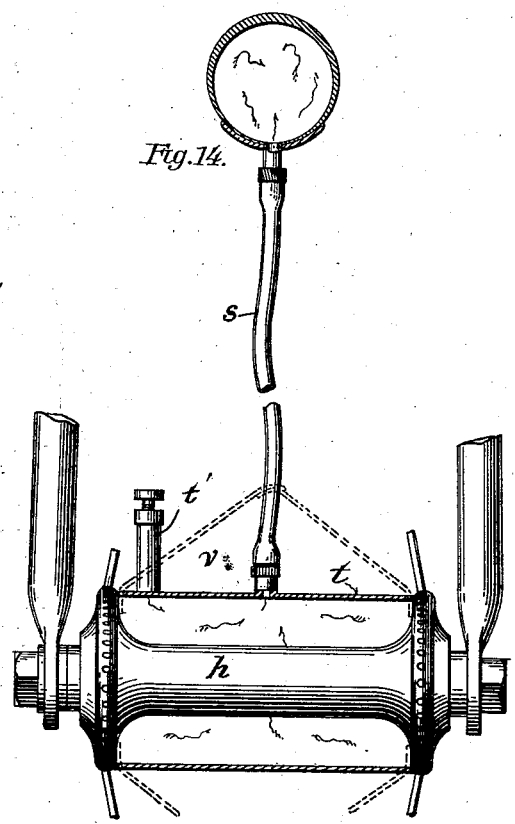
Fig. 14.
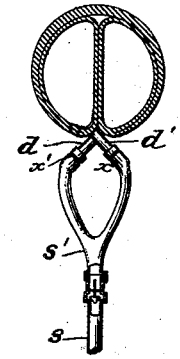
Fig. 17.
Fig. 15.
Witnesses; Inventor;
Frederick D. Owen,
by
Rennie & Goldsborough,
Attys

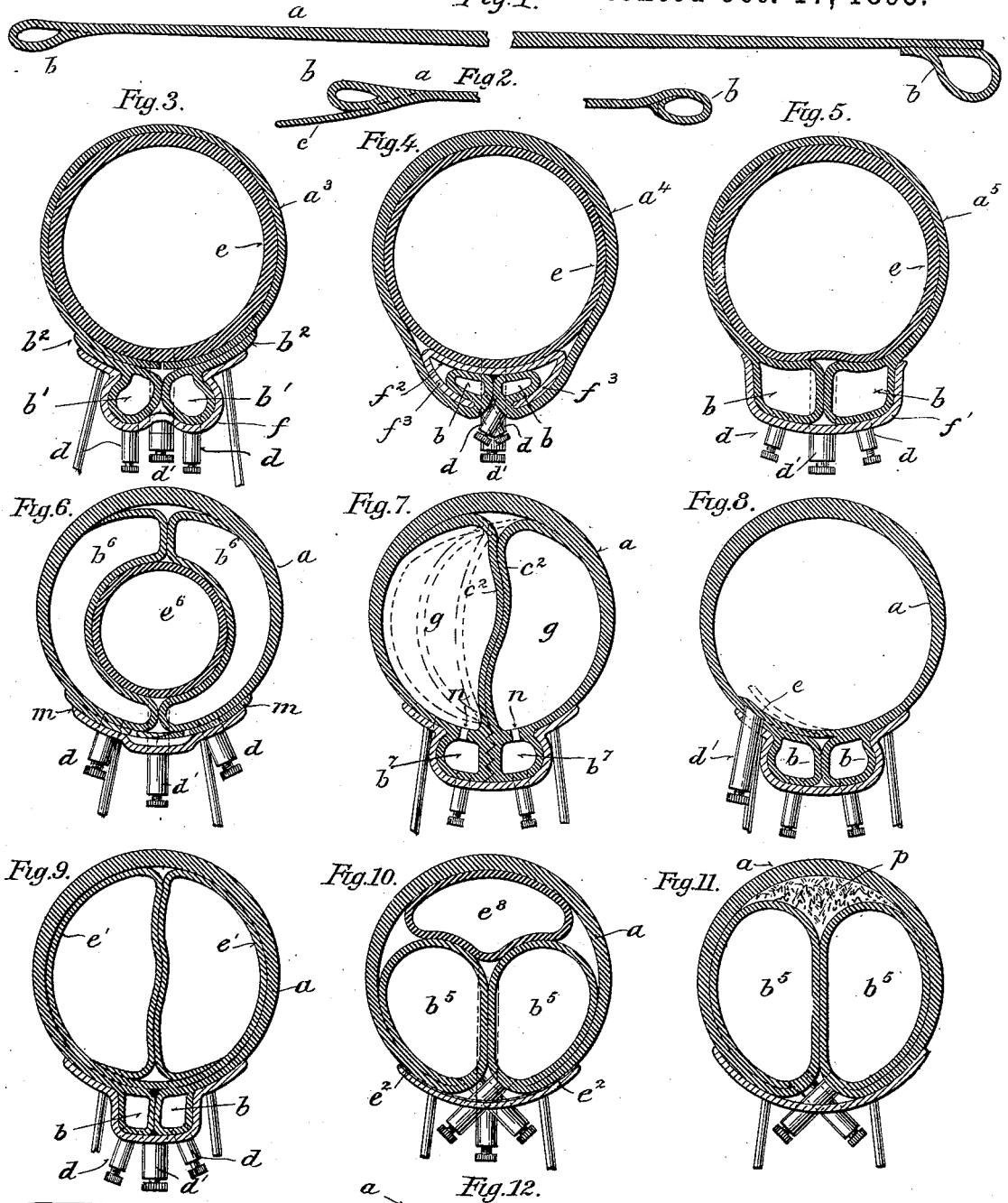

UNITED STATES PATENT OFFICE.

FREDERICK D. OWEN, OF WASHINGTON, DISTRICT OF COLUMBIA.

WHEEL-TIRE.

SPECIFICATION forming part of Letters Patent No. 507,089, dated October 17, 1893.

Application filed March 15, 1893. Serial No. 466,050. (No model.)

*To all whom it may concern:*

Be it known that I, FREDERICK D. OWEN, a citizen of the United States, residing at Washington, in the District of Columbia, have invented certain new and useful Improvements in Wheel-Tires; and I do hereby declare the following to be a full, clear, and exact description of the invention, such as will enable others skilled in the art to which it appertains to make and use the same.

My invention relates to certain new and useful improvements in wheels for cycles and more particularly to improvements in the construction of cycle tires of the pneumatic type and in the means for inflating such tires and releasably securing them to the cycle rim.

The characteristic feature in the manufacture of my improved tire consists in constructing the same from a length of rubber or the like provided along its opposite edges with longitudinal inflatable chambers or compartments, which, when the tire is assembled within the rim, shall lie side by side, abutting against each other, and when inflated locking the tire within the rim or rim groove. In the accompanying drawings I have illustrated a variety of different forms or modifications of tires embodying this generic feature of construction, and I have also shown valve mechanism peculiarly adapted for furnishing the edge chambers, and in some cases the main chamber also, with a supply of air under uniform pressure from a single supply reservoir readily accessible for the attachment of the air compressing pump.

In the drawings, Figure 1 represents, partly broken away, a cross section of one form of blank suitable to the practice of my invention, and illustrates two different ways of constructing the edge chambers. Fig. 2 represents a like view of a modification thereof. Figs. 3 to 11 represent cross sectional views of various forms of tires embodying my invention and illustrate the manner in which they are adapted to be locked in the cycle rim or rim groove. Fig. 12 represents in full lines a cross sectional view of the tire blank employed in the construction shown in Fig. 11 and illustrates in dotted lines the manipulations necessary to fold said blank into the form required in said construction. Fig. 13 represents in side elevation a skeleton view of a bicycle frame whose wheels are provided with tires constructed in accordance with my invention and provided with central air supply reservoirs. Fig. 14 represents a partial elevation and section illustrating more fully the construction of the air supply reservoir of the rear wheel of the bicycle shown in Fig. 13. Fig. 15 represents in longitudinal section the means employed for providing with air the front wheel of the bicycle shown in Fig. 13; and Figs. 16 and 17 represent, partly in section and partly in elevation, the intercommunicating branched supply tubing for maintaining equality of pressure between the several pneumatic chambers.

Similar letters of reference indicate similar parts throughout the several views.

Referring to the drawings, and particularly to Figs. 1, 2 and 12, it will be noted that the main body portion of the tire is formed of a strip $a$ of rubber or other suitable material familiar to the art, of a length sufficient to encircle the cycle wheel rim or rim groove. Along the opposite edges of this main body portion I locate edge inflation chambers. In the form shown in Fig. 1 I have illustrated two different ways of constructing these end chambers, to wit, by turning the edge back and vulcanizing it to the main body portion so as to form the integral chamber $b$, or by cementing, sewing, or otherwise securing to the edge of the main body portion a supplemental inflation chamber $b'$. In the form shown in Fig. 2, like chambers $b$ are illustrated, together with an auxiliary flap $c$ whose function will be hereinafter described in connection with the form of tire shown in Fig. 8.

In Fig. 3, I have illustrated the employment of the tire strip as an outer jacket $a^3$ provided with the supplemental inflatable end chambers $b'$ which are nested side by side abutting against each other within the annular groove $f$ of the cycle wheel rim or felly, the flaps $b^2$ of the chambers $b'$ extending somewhat beyond the outer edges of the rim to present an additional thickness of rubber at said edges, as a cushioning safeguard against abrasion. Tubes $d$ serve as means for inflating the chambers $b'$, and an additional tube $d'$ serves as means for inflating a central pneumatic tube $e$. The expansion of the chambers $b'$ when inflated causes them to exert an effective pressure against each other and to expand into close contact with the walls of the locking groove, thereby securely locking the tire in place. A similar construction is illustrated in Fig. 5, wherein the tire strip $a^5$ is provided with the integral inflatable chambers $b$, which in like manner are caused to hold the central tire $e$ in place by expanding into the grooved rim $f'$ of the cycle wheel. It will, of course, be understood that any other character of tire than the pneumatic tire $e'$ (such as a solid rubber tire or a cushion tire) may be locked to the cycle rim by means of the tire strip in either of these instances, or that, if desired, the central tire may be omitted altogether and its place occupied by a loose filling of wool or the like, or, as shown in Fig. 8, the tire strip itself may be inflated in addition to the edge chambers $b$, and in this instance the tube $d'$ for supplying air to the interior may be located just outside of the tubes $d$, so that the flap $c$ may cover the line of contact of the chambers and extend over the entrance aperture of the tube $d'$ to form a flap valve therefor.

In Fig. 4, the tire strip $a^4$ is shown in its adaptation to the rim $f^2$ having the downwardly and inwardly inclined flanges $f^3$. In this case also the inflatable chambers $b$ rest within the groove afforded beneath the rim surface and abut against each other, their expansion locking the strip $a^4$ in place together with the pneumatic tire $e$ or its equivalent.

To secure a more intimate locking contact between the abutting walls of the edge chambers, I may provide said walls with serrations or interlocking ridges, as indicated for instance in Fig. 7. Fig. 7 also illustrates an expedient for dispensing with separate inflating tubes for the filling-tires $e'$ of Fig. 9. Thus it will be noted that the tire strip of Fig. 7 is provided with flaps $c^2$ extending to the wall or strip and vulcanized thereto thereby forming two inclosed pneumatic chambers $g$ which are inflated by air which reaches their interior through apertures $n$ from the edge chambers $b^7$. Should one of these chambers or compartments become deflated or partly deflated the other is adapted to expand correspondingly, as shown in dotted lines.

In the form shown in Fig. 6, I have greatly enlarged the dimensions of the edge chambers $b^6$ so as to adapt them to encircle a central filling tire $e^6$, in the manner indicated. Cushioning strips $m$ of rubber or the like cemented to the tire strip $a$ lessen liability of abrasion, and may be secured together by lacing as shown; or a circumferential tape $e^2$ may be cemented on.

Another instance of the enlarged end chambers is shown in Fig. 12 wherein is also shown in dotted lines the manner of folding the blank to form the tire shown in Figs. 11 and 17. As thus constructed the enlarged edge chambers $b^5$ are adapted not only to lock the tire in place but by their larger expansion to form or constitute the elastic pneumatic filling of the tire. If desired, an additional filling may be provided, as, for instance, a filling of wool $p$, as shown in Fig. 11, or a pneumatic tire $e^8$ as shown in Fig. 10.

The tire shown in Fig. 9 is formed by inclosing within a jacket $a$ of the kind shown in Fig. 5, an inflatable tire of the kind shown in Fig. 12, but inverted as indicated, and the inflatable compartments $e'$ practically filling the jacket. A patch $e^2$ of rubber or canvas may be cemented across the two compartments if desired.

I prefer to supply the compressed air to the pneumatic edge chambers and inner pneumatic filling tube in the various forms of my invention from a central source of supply. As shown in Fig. 15, this central source of supply may be the cycle axle $h$ made hollow for the purpose and provided at one or both of its ends with means for the attachment of the usual tire-inflating air pump. These means may consist of a check valve $r$ of smaller diameter than the valve chamber $r'$ in which it is located and normally seated by a spring $r^2$ against the inlet opening which is closed by the screw plug $r^3$. By removing the screw plug and attaching the air pump in place thereof, compressed air may be forced into the hollow axle and passes thence through the supply tube $s$ communicating with the interior of the axle and leading into the pneumatic compartments. The supply tube $s$ is branched at its upper end $s'$ and the branches are severally connected with the nipples $d\ d'$. It is of special importance that the abutting edge chambers be thus connected to a supply pipe common to both as it enables them to be inflated simultaneously and establishes and maintains equality of pressure in the two edge chambers, a condition particularly desirable in order to develop and utilize their locking function to the best advantage. A valve or cock $x$ may be provided in the branch leading to the inner pneumatic tube, as indicated in Fig. 16, if desired, to shut off communication between said inner tube and the edge chambers or compartments; but, I may, if desirable, dispense with all valves or cocks in the nipples when coupled together in the manner shown in Figs. 16 and 17.

Instead of taking in the compressed air through a hollow axle, I may, as shown in Fig. 14, surround the axle with an air tight casing $t$ thereby forming a central air supply chamber having a nipple $t'$ for connecting the air pump. In this instance, there is constantly stored up within the central chamber a supply of compressed air which may, if desired, be of higher pressure than the volume of air contained in the pneumatic compartments. I effect this result by shutting off a valve $v$ in the supply tube $s$ as soon as the pressure in charging the compartments has reached the desired limit, and then continuing the charging of the central chamber until such excess of pressure is secured therein as may be suitable. If now, while on the road, the pressure in the pneumatic compartments should drop, I may bring it up to the standard required by admitting a suitable supply from the high pressure chamber through the valve $v$. I do not, however, confine myself to the employment of a valve $v$ or its equivalent, as certain advantages are incident to utilizing the central supply chamber as part of a constant cross communication between various parts of the interior of the tire. Thus, as shown in Fig. 13, a number of supply tubes may radiate to different parts of the tire from the supply chamber as a center, with the advantage not only of inflating the compartments more uniformly and evenly, but also of affording what might be termed a short cut for the transmission of the compressions due to the impact of the advancing tire with the ground from one part of the tire to another. This feature is of advantage as well when the tire supplied is the usual single pneumatic tire as illustrated in Fig. 14, and I desire therefore to be understood as claiming it broadly.

It will be noted that in Fig. 16 I have shown the branches of the supply pipe leading to the edge compartments as provided with valves $x'$ whereby the edge compartments can be shut off from communication with each other or with the main compartment, so that either compartment may remain inflated during repairs of the other or others. The same shut-off valves $x'$ are also present in the construction shown in Fig. 17 and for a like purpose.

Having thus described my invention, what I claim is—

1. A tire strip consisting of a sheet of rubber having its edges turned over and secured to the wall of the strip so as to form compartments having in cross section one straight and one curved side; substantially as described.

2. A tire strip provided at its edges with inflatable compartments or chambers and having a flap extending beyond one of said compartments; substantially as described.

3. A tire strip provided at its edges with inflatable compartments or chambers and having a flap extending beyond one of said compartments, said flap being reunited to the strip to form a second inflatable compartment; substantially as described.

4. A tire strip provided at its edges with inflatable compartments or chambers and having a flap extending beyond one of said compartments, said flap being reunited to the strip to form a second inflatable compartment communicating with the adjacent edge compartment; substantialy as described.

5. A tire strip provided at its edges with inflatable compartments, the abutting walls of said compartments having interlocking projections; substantially as described.

6. A tire strip provided at its edges with inflatable compartments and having its intermediate portion of a length to form with the compartments a tire of substantially circular contour when the compartments are folded inwardly upon said middle portion and inflated; substantially as described.

7. A tire having abutting inflatable locking edge compartments; substantially as described.

8. A tire having inflatable edge compartments serving as a partial filling for the tire; substantially as described.

9. A tire having inflatable edge compartments serving as a partial filling for the tire and a supplemental filling between the folds of the compartments and the main wall of the tire; substantially as described.

10. A tire having inflatable edge compartments serving as a partial filling for the tire and a supplemental filling between the folds of the compartments and the main wall of the tire, said supplemental filling consisting of a pneumatic tube; substantially as described.

11. A wheel having a grooved felly or rim and having a tire provided with inflatable compartments lying within the groove and abutting against each other so as to lock the tire to the felly on inflation of said compartments; substantially as described.

12. An inflatable tire provided with cross tubes extending from one part of its interior to another across the space bounded by the tire; substantially as described.

13. An inflatable tire provided with a central source of air supply at the wheel hub and tubes radiating from said source of supply to various points of the tire interior across the space bounded by the tire; substantially as described.

14. An inflatable tire, provided with an air supply reservoir for storing air under pressure, a supply tube communicating with the tire's interior, and a valve for establishing or cutting off communication between the tire and supply reservoir; substantially as described.

15. A tire having inflatable abutting compartments and an air supply pipe having branches leading to said compartments, so as to inflate them simultaneously; substantially as described.

16. A tire having inflatable abutting compartments and means for inflating the same, said compartments communicating with each other so as to be under equal pressure; substantially as described.

17. A tire having intercommunicating inflatable locking compartments; substantially as described.

18. A tire having inflatable edge compartments and a branched supply pipe for inflating said compartments simultaneously; substantially as described.

19. A tire having inflatable edge compartments and an inflatable pneumatic filling tube, in combination with a branched supply pipe for filling the compartments and tube simultaneously; substantially as described.

20. A tire having inflatable edge compartments and a branched supply pipe for inflating said compartments simultaneously, the branches of the supply pipe having each a shut-off valve; substantially as described.

21. A tire having inflatable edge compartments and an inflatable pneumatic filling tube, in combination with a branched supply pipe for filling the compartments and tube simultaneously, the branches of the supply pipe having each a shut-off valve; substantially as described.

In testimony whereof I affix my signature in presence of two witnesses.

FREDERICK D. OWEN.

Witnesses:
   HENRY E. COOPER,
   SIDNEY P. HOLLINGSWORTH.